2,819,923
SUSPENSION SLING

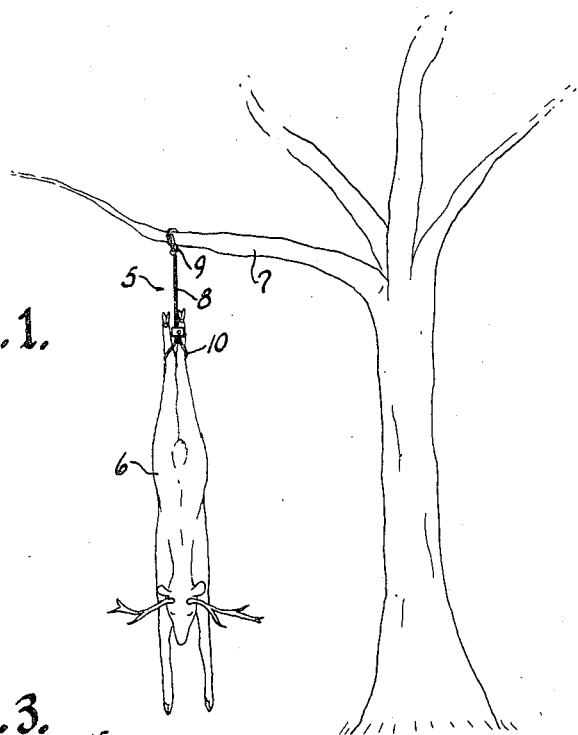
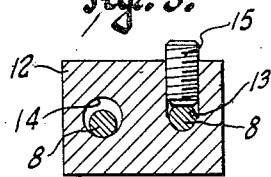
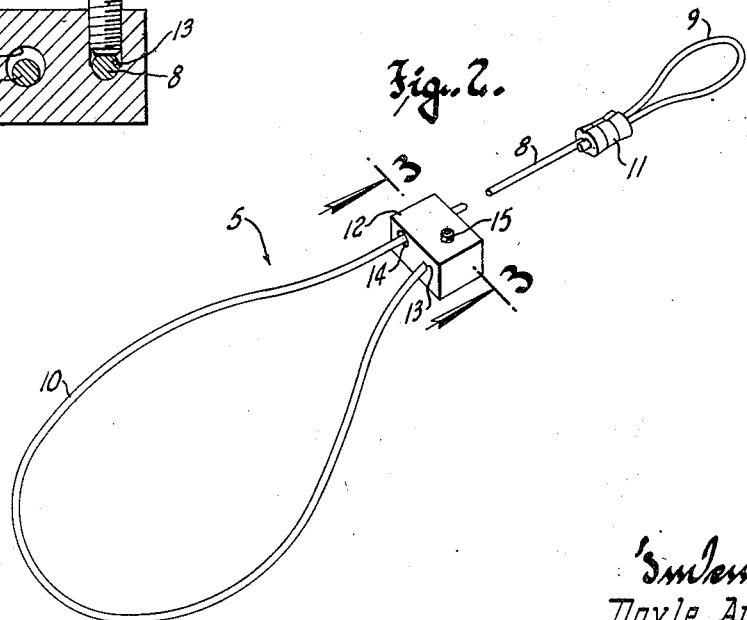

Doyle Anderson, Fort Wayne, Ind.

Application August 17, 1955, Serial No. 528,866

1 Claim. (Cl. 294—74)

This invention relates to a sling suspension, and refers more particularly to a device especially useful for supporting game and carcasses above the ground to facilitate skinning and dressing thereof.

It is an object of this invention to provide a light, compact and inexpensive sling suspension device which may be readily carried by hunters and which is especially suitable for use as a gambrel.

More particularly it is an object of this invention to provide a sling suspension which is readily adaptable to supporting all sorts of game and carcasses above the ground to facilitate cleaning and dressing the same, and which is substantially self-adjusting to accommodate game ranging in size from small fowl to deer.

Another object of this invention is to provide a light, readily portable sling suspension which may be easily secured to any convenient elevated support, such as a tree limb, and which is especially advantageous for suspending game and carcasses because no portion of the suspension device penetrates the flesh, although the security with which the carcass is held increases with the imposition of increased load forces upon the suspension.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which:

Figure 1 is a perspective view showing the sling suspension of this invention in use, supporting a deer from a limb of a tree;

Figure 2 is a perspective view of the sling suspension of this invention per se; and Fig. 3 is a sectional view taken on the plane of the line 3—3 in Figure 2.

Referring now more particularly to the accompanying drawing, in which like numerals designate like parts throughout the several views, the numeral 5 designates generally the sling suspension of this invention, which is especially well adapted for use by hunters and sportsmen, as well as by farmers, butchers and poultry and likestock men, and which may be used for a wide variety of purposes, as for suspending a deer 6 or other game from any convenient elevated support, such as the limb 7 of a tree.

Essentially the sling suspension comprises a substantially thin strand 8 of flexible material, such as steel wire cable, having its end portions formed into a permanent loop 9 and an adjustable loop 10. The permanent loop is small, and is provided by securing an end portion of the strand to a medial portion thereof, as by means of a clinched or swaged ferrule 11.

The adjustable loop is provided by means of a block 12 of metal or other hard material of a size so related to that of the permanent loop 9 as to readily pass therethrough, but large enough to accommodate a pair of spaced apart substantially parallel bores 13 and 14 therethrough. In one of these bores 14 the medial portion of the strand is freely slidably received, while the end portion of the strand opposite to that secured by the ferrule 11 is anchored in the other bore 13, as by means of a set screw 15 threaded into the block with its axis transverse to that of the bore and which enters the bore to securely engage the strand. The use of a set screw or other releasable securement means for anchoring the end of the strand into the block permits continued use of the device in the event the strand breaks or wears, since the broken-off portion can be readily removed from the block and the new end portion inserted thereinto and anchored.

In using the sling suspension of this invention the small permanent loop 9 is thrown over any suitable elevated support and the remainder of the strand is pulled through the loop, as shown in Figure 1, to provide a loop of strand embracing the support. Obviously, if the support has short length, like a peg or short stump of tree limb, the permanent loop may be slipped directly thereover.

The carcass or other object to be suspended is then lifted into the embrace of the adjustable loop 10, and the block is slid along the strand to tighten the loop snugly around the legs or other portion of the carcass. As the full weight of the animal is imposed upon the bight of the adjustable loop, the latter will tend to decrease in size, in accordance with the familiar principle of the slip noose. Relieving the weight of the carcass upon the tension sling will permit the block to be slid along the strand to enlarge the adjustable loop, enabling immediate removal of the carcass from the suspension sling.

Because of the facility with which the size of the adjustable loop may be altered, it will be immediately apparent that the sling suspension of this invention may be used with animal carcasses of many shapes and sizes, ranging from big game, swine and cattle to small fowls.

Obviously a pair of sling suspensions may be used to hold up an animal to be dressed, each suspension having its adjustable loop fastened around one leg of the carcass. Securement of the fixed loops of the two suspensions to horizontally spaced apart elevated supports will then facilitate cleaning the carcass and enable it to be readily split from head to tail, after which each of the carcass halves will be separately but securely supported.

From the foregoing description, taken together with the accompanying drawing, it will be readily apparent that this invention provides a light, compact and inexpensive sling suspension whereby carcasses and other objects may be readily and very securely suspended from any suitable elevated support, without any portion of the suspended object being pierced as would be the case in using a hook-like gambrel.

I claim:

A suspension sling comprising: a length of flexible metal cable; a ferrule clinched around an end portion of the cable and a medial portion thereof to define a permanent loop in the cable; a metal block of a size to readily pass through said fixed loop and having a pair of lengthwise adjacent bores therethrough of substantially equal diameter and spaced apart a distance substantially greater than the diameter of the cable; the medial portion of the cable being freely slidably received in one of said bores in the block and the other end of the cable being received in the other of said bores; and a set screw threaded into said block and entering said second designated bore therein, transversely to the axis thereof, to engage and secure said other end of the cable, so that the length of the cable between the portions thereof received in the bores in the block defines an adjustable loop at the side of the block remote from said fixed loop, the size of which may be readily changed from a minimum at which the adjustable loop end of the cable extends nearly straight across the adjacent end of the block to confine very small objects therebetween, to a maximum size limited only by the engagement of said ferrule with the opposite side of the block, by sliding the block along the medial portion of the cable.

References Cited in the file of this patent

UNITED STATES PATENTS

| | | |
|---|---|---|
| 849,832 | Collins | Apr. 9, 1907 |
| 1,144,430 | Powers | June 29, 1915 |
| 1,792,439 | Nelson | Feb. 10, 1931 |
| 1,959,985 | Moll | May 22, 1934 |
| 2,327,683 | Warner et al. | Aug. 24, 1943 |
| 2,476,731 | Hobbs | July 19, 1949 |
| 2,487,853 | Coons | Nov. 15, 1949 |
| 2,520,325 | Moore | Aug. 29, 1950 |
| 2,679,709 | DuBois | June 1, 1954 |